US012560564B2

(12) United States Patent 
Ishigaki et al.

(10) Patent No.: US 12,560,564 B2 
(45) Date of Patent: Feb. 24, 2026

(54) DETECTION DEVICE, MANAGEMENT DEVICE, AND DETECTION METHOD

(71) Applicant: KABUSHIKI KAISHA TOYOTA CHUO KENKYUSHO, Nagakute (JP)

(72) Inventors: Masanori Ishigaki, Nagakute (JP); Keisuke Ishikawa, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 160 days.

(21) Appl. No.: 18/266,891

(22) PCT Filed: Dec. 28, 2021

(86) PCT No.: PCT/JP2021/048851 
§ 371 (c)(1), 
(2) Date: Jun. 13, 2023

(87) PCT Pub. No.: WO2022/153874 
PCT Pub. Date: Jul. 21, 2022

(65) Prior Publication Data 
US 2024/0044827 A1 Feb. 8, 2024

(30) Foreign Application Priority Data

Jan. 13, 2021 (JP) ................................. 2021-003692

(51) Int. Cl. 
*G01N 27/02* (2006.01) 
*H01M 10/0525* (2010.01) 
*H01M 10/42* (2006.01)

(52) U.S. Cl. 
CPC ......... *G01N 27/02* (2013.01); *H01M 10/0525* (2013.01); *H01M 10/425* (2013.01); *H01M 2010/4271* (2013.01)

(58) Field of Classification Search 
None 
See application file for complete search history.

(56) References Cited

U.S. PATENT DOCUMENTS 11,614,493 B2 * 3/2023 Mizuno ................ G01R 31/389 
429/62 
2009/0218986 A1 9/2009 Jarvinen 
(Continued)

FOREIGN PATENT DOCUMENTS

CN 102539005 A 7/2012 
CN 102967831 A 3/2013 
(Continued)

OTHER PUBLICATIONS

Translation of JP 2017033824A (Year: 2017).* 
Jan. 23, 2024 Office Action issued in Japanese Patent Application No. 2022-011638. 
Feb. 15, 2022 International Search Report issued in International Patent Application No. PCT/JP2021/048851. 
(Continued)

*Primary Examiner* — Jermele M Hollington 
(74) *Attorney, Agent, or Firm* — Oliff PLC

(57) ABSTRACT

A detection device for detecting a status of a lithium-ion secondary battery includes a control module that acquires real part of AC impedance at a frequency at which the real part of the AC impedance is increased 10 times or more than the real part of the AC impedance at 1 kHz due to a skin effect, and detects deposition of lithium and/or the presence of foreign metal inside the lithium-ion secondary battery by using the acquired real part of the AC impedance.

9 Claims, 10 Drawing Sheets

(56) References Cited

U.S. PATENT DOCUMENTS

| | | | | |
|---|---|---|---|---|
| 2012/0182020 | A1* | 7/2012 | Akutsu | H01M 10/48 |
| | | | | 324/430 |
| 2012/0316815 | A1* | 12/2012 | Morigaki | G01R 31/392 |
| | | | | 702/63 |
| 2014/0218042 | A1 | 8/2014 | Koba et al. | |
| 2018/0056809 | A1 | 3/2018 | Uchida | |
| 2018/0309327 | A1 | 10/2018 | Miyamoto et al. | |
| 2019/0023131 | A1 | 1/2019 | Katayama et al. | |
| 2020/0209319 | A1 | 7/2020 | Mitsui et al. | |
| 2020/0408844 | A1* | 12/2020 | Ogasawara | G01K 13/00 |
| 2023/0231209 | A1* | 7/2023 | Yamagami | H01M 10/44 |
| | | | | 320/134 |
| 2024/0201274 | A1* | 6/2024 | Ishikawa | G01R 31/389 |

FOREIGN PATENT DOCUMENTS

| | | | |
|---|---|---|---|
| CN | 103163377 | A | 6/2013 |
| CN | 104950176 | A | 9/2015 |
| CN | 108614220 | A | 10/2018 |
| EP | 4 060 599 | A1 | 9/2022 |
| JP | 2012-212513 | A | 11/2012 |
| JP | 2017033824 | A * | 2/2017 |
| JP | 2018-032558 | A | 3/2018 |
| JP | 2019-211232 | A | 12/2019 |
| JP | 2020-106315 | A | 7/2020 |
| JP | 2021-077570 | A | 5/2021 |
| WO | 2013/115038 | A1 | 8/2013 |
| WO | 2017/179266 | A1 | 10/2017 |
| WO | 2021/246788 | A1 | 12/2021 |

OTHER PUBLICATIONS

Jul. 4, 2023 International Preliminary Report on Patentability issued in International Patent Application No. PCT/JP2021/048851.
Oct. 6, 2022 International Search Report issued in International Patent Application No. PCT/JP2022/024998.
Oct. 6, 2022 Written Opinion issued in International Patent Application No. PCT/JP2022/024998.
Petzl et al., "Lithium Plating in a Commercial Lithium Ion Battery—A Low-Temperature Aging Study," Journal of Power Sources, Nov. 14, 2014, vol. 275, pp. 799-807.
Gargh et al., "Correlating Capacity Fade with Film Resistance Loss in Fast Charging of Lithium-Ion Battery," Journal of Power Sources, Dec. 24, 2020, vol. 485, XP086433760, ISSN: 0378-7753.
Xiang et al., "Detection of Lithium Plating in Lithium-Ion Batteries by Distribution of Relaxation Times," Journal of Power Sources, Apr. 8, 2021, vol. 496, XP086543124, ISSN: 0378-7753.
Mar. 28, 2023 International Search Report issued in International Patent Application No. PCT/JP2022/047162.
Mar. 28, 2023 Written Opinion issued in International Patent Application No. PCT/JP2022/047162.
May 25, 2023 International Search Report issued in International Patent Application No. PCT/JP2023/010576.
May 25, 2023 Written Opinion issued in International Patent Application No. PCT/JP2023/010576.
Jun. 2, 2025 Office Action issued in U.S. Appl. No. 18/288,106.
Sep. 15, 2025 Office Action issued in U.S. Appl. No. 18/288,106.
Sep. 30, 2025 Office Action issued in Japanese Patent Application No. 2022-011638.

* cited by examiner

Fig. 2
Fig. 2A
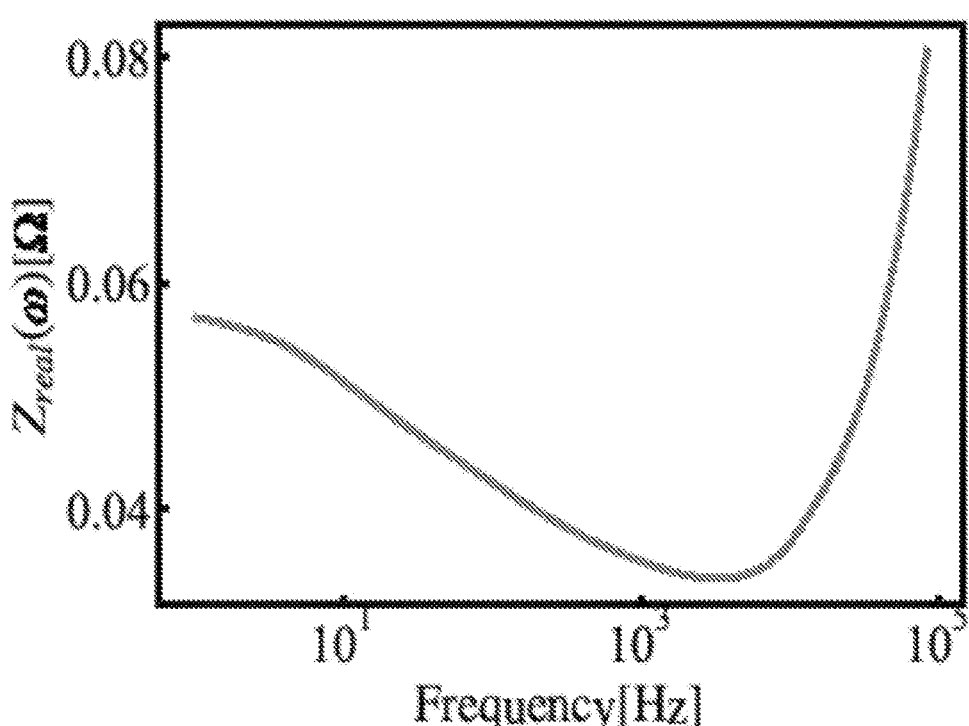
Fig. 2B
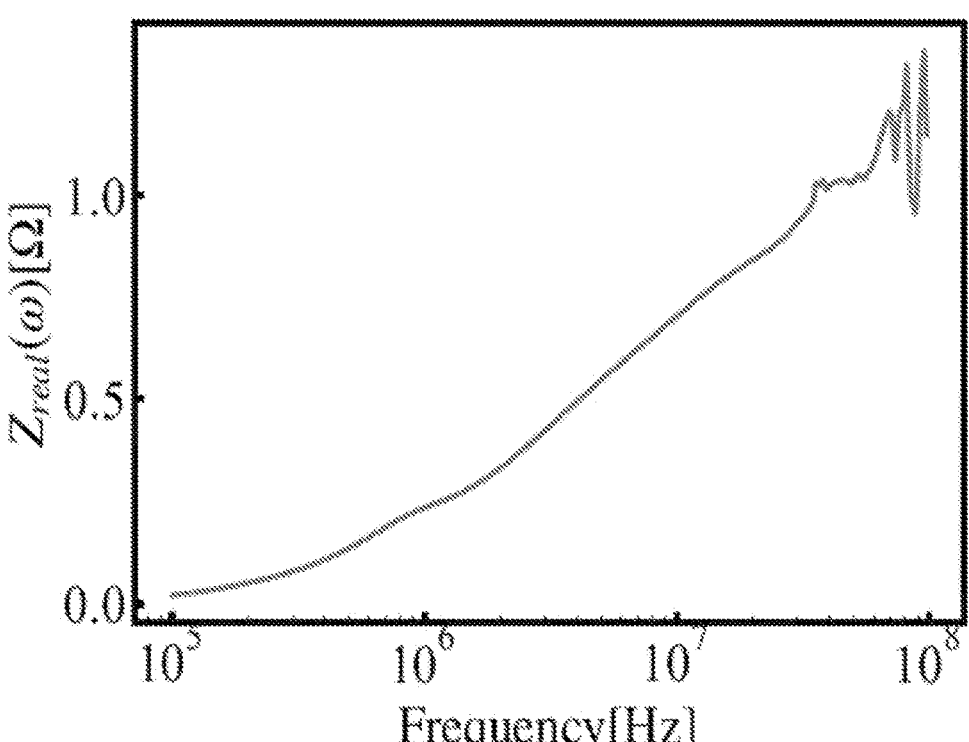

Mechanical Structure Model

| Cu | Anode | Lithium / SEI | Separator impregnated by electrolyte | Surface film | Cathode | Al |

Fig. 3B

Equivalent Circuit Model

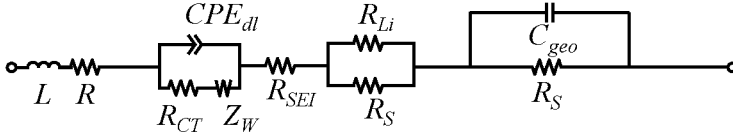

$$L_a \quad R_a \quad R_{CTa} \quad Z_{Wa} \quad CPE_{dla} \quad R_{SEI} \quad R_S \quad R_{Li} \quad C_{geo} \quad R_S \quad R_{surf} \quad Z_{Wc} \quad R_{CTc} \quad CPE_{dlc} \quad R_c \quad L_c$$

Fig. 3C

Simplified Model of Equivalent Circuit

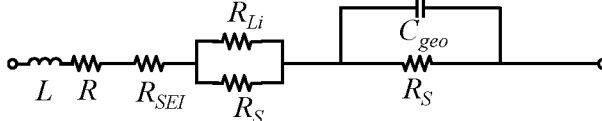

$$L \quad R \quad R_{CT} \quad Z_W \quad CPE_{dl} \quad R_{SEI} \quad R_S \quad R_{Li} \quad C_{geo} \quad R_S$$

Fig. 3D

Model of Equivalent Circuit in Terms of High-frequency Function $$L \quad R \quad R_{SEI} \quad R_{Li} \quad R_S \quad C_{geo} \quad R_S$$

$$Z(\omega) = R + R_{SEI} + \frac{R_{Li}R_S}{R_{Li} + R_S} + \frac{R_S}{1 + \omega^2 C_{geo}^2 R_S^2} \quad \cdots \text{Equation (1)}$$

1

DETECTION DEVICE, MANAGEMENT DEVICE, AND DETECTION METHOD

TECHNICAL FIELD

This description discloses a detection device, a management device, and a detection method.

BACKGROUND ART

Until now, as a degradation determination method for a lithium secondary battery, there has been proposed a method of discharging the battery to a state with SOC of 10% or below and detecting a battery status based on a measured value of impedance of the battery under measurement (see, for example, Patent Literature 1). According to Patent Literature 1, the proposed detection method can simply and highly accurately detect the status of the lithium secondary battery. Another proposal is a method of calculating an inclination angle in linear approximation of complex impedances at two or more different frequencies within a diffusion region of the secondary battery, determining the battery to be normal in capacity balance if the inclination angle is not less than a threshold, and determining the battery to be abnormal for the reason of imbalance in capacity if the inclination angle is less than the threshold (see, for example, Patent Literature 2). According to Patent Literature 2, the proposed detection method can highly accurately detect a status of the battery, especially whether the battery is normal or abnormal and a degradation degree of the battery by a complex impedance analysis of the battery. Still another proposal is a method of detecting a change in status of a constituent member of the battery based on a change in peak of a relaxation time in a frequency band appearing in an arc shape on a Nyquist plot that is obtained from a measurement result of AC (alternating current) impedance (see, for example, Patent Literature 3). According to Patent Literature 3, the proposed detection method can analyze an internal status or a change in the status of the battery.

CITATION LIST

Patent Literature

PTL 1: JP 2012-212513 A
PTL 2: WO 2013/115038 A1
PTL 3: WO 2017/179266 A1

SUMMARY OF INVENTION

Technical Problem

Although the above-described Patent Literatures 1 to 3 aim to detect a status of degradation of the lithium-ion secondary battery, the status of the battery degradation includes, for example, degradation accompanied by deposition of lithium metal and degradation not accompanied by the deposition of the lithium metal, and Patent Literatures 1 to 3 cannot detect those detailed statuses. For example, although Patent Literature 1 estimates an amount of deposited lithium from a reaction resistance value, the reaction resistance value is a parameter affecting not only the amount of the deposited lithium, but also an amount of a coating film formed, and it seems difficult to say that Patent Literature 1 can accurately diagnose the deposited lithium. Furthermore, although Patent Literature 2 intends to determine whether the capacity balance is normal or abnormal based on frequency differentiation of the two or more complex impedances, Patent Literature 2 does not take into consideration, for example, detection of deposition of the lithium metal. Moreover, although Patent Literature 3 intends to obtain the peak of the relaxation time from the Nyquist plot of the AC impedance and to estimate the amount of the coating film formed on an electrode, the frequency band used is at low frequencies of 10 mHz to 10 kHz, for example, and a difficulty arises in separating the amount of the deposited lithium and the amount of the formed coating film. Thus, a technique of detecting the status of the degradation of the lithium-ion secondary battery in detail is demanded.

The present disclosure has been made in view of the above-described problems, and a main object of the present disclosure is to provide a novel detection device, management device, and detection method each capable of detecting the status of the lithium-ion secondary battery in detail.

Solution to Problem

As a result of intensive studies aiming at achievement of the above-mentioned object, the inventors have found that a battery status, such as the presence of lithium metal and foreign metal and formation of a coating film inside the lithium-ion secondary battery, can be examined in detail from AC impedance characteristics of the lithium-ion secondary battery in a particular frequency band, and have succeeded in accomplishing the invention disclosed in this description.

A detection device disclosed in this description is a detection device for detecting a status of a lithium-ion secondary battery, the detection device including:

a control module that acquires real part of AC impedance at a frequency at which the real part of the AC impedance is increased 10 times or more than the real part of the AC impedance at 1 kHz due to a skin effect, and that detects deposition of lithium and/or the presence of foreign metal inside the lithium-ion secondary battery by using the acquired real part of the AC impedance.

A management device disclosed in this description is a management device for managing the lithium-ion secondary battery based on information obtained from the above-described detection device, the management device including:

a management module that sets a recycle application of the lithium-ion secondary battery by using a detection result of lithium deposition inside the lithium-ion secondary battery, the detection result being output from the control module.

Alternatively, a management device disclosed in this description is a management device for managing the lithium-ion secondary battery based on information obtained from the above-described detection device, the management device including:

a management module that sets whether to ship the lithium-ion secondary battery by using a detection result of the presence of foreign metal inside the lithium-ion secondary battery, the detection result being output from the control module.

A detection method disclosed in this description is a detection method of detecting a status of a lithium-ion secondary battery, the detection method including the step of:

detecting deposition of lithium and/or the presence of foreign metal inside the lithium-ion secondary battery by using real part of AC impedance at a frequency at which the real part of the AC impedance is increased 10 times or more than the real part of the AC impedance at 1 kHz due to a skin effect.

Advantageous Effects of Invention

According to the present disclosure, the novel detection device, management device, and detection method each capable of detecting the status of the lithium-ion secondary battery in detail can be provided. The reason why the present disclosure has the above-mentioned advantageous effect is inferred as follows. For example, a decrease in resistance attributable to the lithium deposition can be captured at a high frequency at which diffusion, reaction, movement, and so on of components of the lithium-ion secondary battery, such as lithium ions, cannot follow, the high frequency being within a high frequency band (for example, a frequency band not lower than 100 kHz) in which measurement can be performed. It is also inferred that, in such a high frequency band, the measurement is not affected by degradation caused by diffusion, reaction, movement, and so on of other components than the lithium ions and has sensitivity for only metal deposition. The frequencies of the AC impedance substantially studied in Patent Literatures 1 to 3 are in a range not higher than 10 kHz and is $\frac{1}{1000}$ or less than the frequency used in the present disclosure at which the real part of the AC impedance is increased 10 times or more due to the skin effect. In other words, obtained information is different at frequencies used.

BRIEF DESCRIPTION OF DRAWINGS

FIG. 2 is a graph representing an example of a relationship of real part Z of AC impedance with respect to frequency.

FIG. 3 is an explanatory view illustrating an example of an equivalent circuit model.

DESCRIPTION OF EMBODIMENTS (Battery Management System 10)

Figure 1:
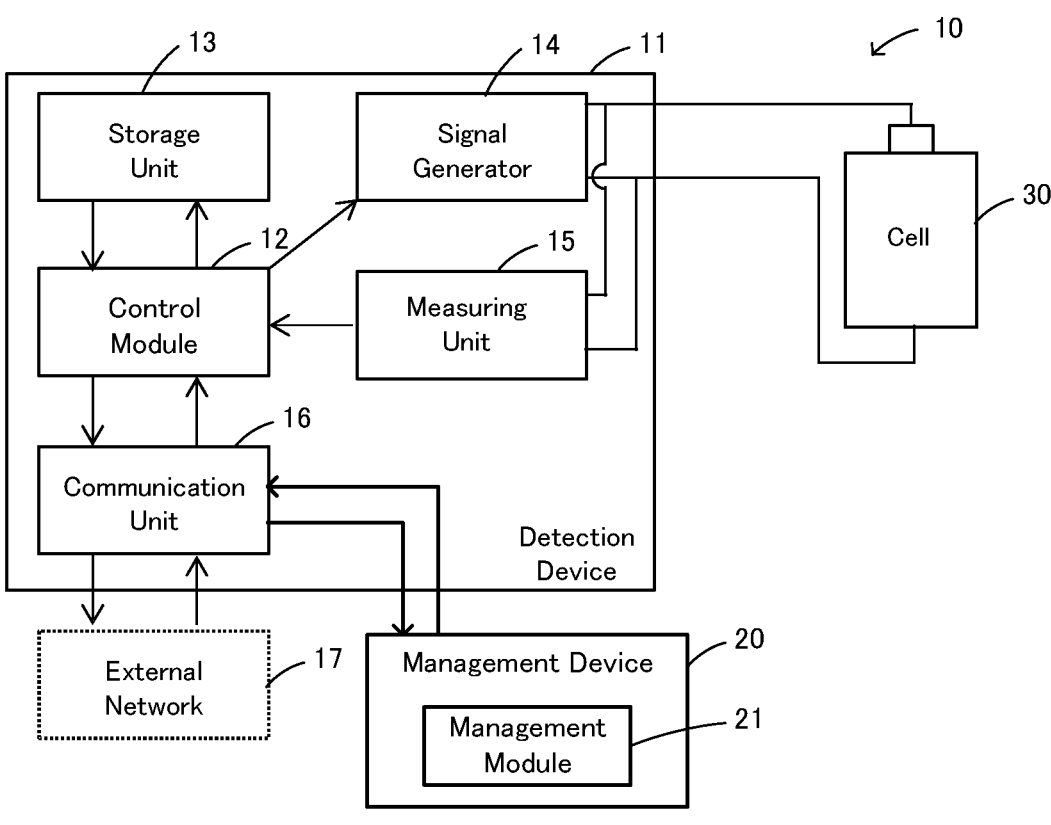
FIG. 1 is an explanatory view illustrating an example of a battery management system 10.

An embodiment of a detection device disclosed in this description will be described below with reference to the drawings. FIG. 1 is a schematic explanatory view illustrating an example of a battery management system 10. The battery management system 10 is, for example, a system for executing management of sale and use of a lithium-ion secondary battery (cell 30) manufactured. The battery management system 10 includes a detection device 11 and a management device 20.

First, the cell 30 as a measurement target is described. The cell 30 is constituted as the lithium-ion secondary battery. The cell 30 may include, for example, a positive electrode, a negative electrode, and an ion conducting medium that is disposed between the positive electrode and the negative electrode and that conducts carrier ions. The positive electrode may contain, as a positive electrode active material, a carbide containing a transition metal element, an oxide containing lithium and a transition metal element, or the like. The positive electrode active material can be made of, for example, a lithium manganese composite oxide expressed by a basic composition formula such as $Li_{(1-x)}MnO_2$ (e.g., $0<x<1$, this is similarly applied to the following description) or $Li_{(1-x)}Mn_2O_4$, a lithium cobalt composite oxide expressed by a basic composition formula such as $Li_{(1-x)}CoO_2$, a lithium nickel composite oxide expressed by a basic composition formula such as $Li_{(1-x)}NiO_2$, or a lithium nickel cobalt manganese composite oxide expressed by a basic composition formula such as $Li_{(1-x)}Ni_aCo_bMn_cO_2$ ($a+b+c=1$). The term "basic composition formula" indicates that the material may contain one or more other elements. The negative electrode may contain, as a negative electrode active material, a carbon material, a composite oxide containing lithium, or the like. The negative electrode active material may be, for example, lithium, an inorganic compound such as a lithium alloy or a tin compound, a carbon material capable of occluding and releasing lithium ions, a composite oxide containing a plurality of elements, or a conductive polymer. Examples of the carbon material may be cokes, glassy carbons, graphites, non-graphitizable carbons, pyrolytic carbons, carbon fibers, and so on. Among those examples, the graphites such as artificial graphite and natural graphite are preferable. Examples of the composite oxide may be a lithium titanium composite oxide, a lithium vanadium composite oxide, and so on. The ion conducting medium can be given as, for example, an electrolyte solution in which support salt is dissolved. The support salt may be, for example, lithium salt such as $LiPF_6$ or $LiBF_4$. Examples of a solvent for the electrolyte solution may be carbonates, esters, ethers, nitriles, furans, sulfolanes, dioxolanes, and so on. Those examples can be used solely or in combination. More specifically, the carbonates may be, for example, cyclic carbonates such as ethylene carbonate, propylene carbonate, vinylene carbonate, butylene carbonate, and chloroethylene carbonate, or chain carbonates such as dimethyl carbonate, ethyl methyl carbonate, diethyl carbonate, ethyl-n-butyl carbonate, methyl-t-butyl carbonate, di-i-propyl carbonate, and t-butyl-1-propyl carbonate. The ion conducting medium can be made of, for example, a solid ion-conducting polymer, an inorganic solid electrolyte, a mixed material of an organic polymer electrolyte and an inorganic solid electrolyte, or inorganic solid powders bound together by an organic binder. In the solid electrolyte or the cell 30, a separator may be disposed between the positive electrode and the negative electrode.

The detection device 11 detects a status of degradation of the lithium-ion secondary battery, for example, the presence of a deposit of inert lithium metal and foreign metal inside the cell 30 and a status of formation of a coating film. The detection device 11 includes a control module 12, a storage unit 13, a signal generator 14, a measuring unit 15, and a communication unit 16. The control module 12 is constituted as, for example, a CPU-centric microprocessor and controls the entirety of the device. The control module 12 outputs signals to the storage unit 13, the signal generator 14, and the communication unit 16 and receives signals from the storage unit 13, the measuring unit 15, and the communication unit 16. The control module 12 detects at least one of a status of deposition of solid metal lithium and the presence of the foreign metal inside the cell 30 by using information about real part of AC impedance, the information being obtained from the measuring unit 15. The storage unit 13 is constituted as, for example, a storage device with a large capacity, such as a HDD, and stores information of measurement results and programs for use in inspection of the cell 30. The signal generator 14 generates a signal of a predetermined frequency at which the real part of the AC impedance is increased 10 times or more than that at 1 kHz due to a skin effect and applies the generated signal of the predetermined frequency to the cell 30. The predetermined frequency for use in detecting the real part of the AC impedance may be set to, for example, a range higher than 10 kHz or a range not lower than 100 kHz. FIG. 2 is a graph representing a relationship of an example of real part Z of AC impedance with respect to frequencies from a low frequency to a high frequency. FIG. 2A represents the relationship in a range of 1 Hz to 100 kHz, and FIG. 2B represents the relationship in a range of 100 kHz to 100 MHz. The AC impedance measured near 1 kHz has an ohmic resistance component. The detection device 11 detects the real part of the AC impedance at a frequency, namely in a high frequency band, at or in which the real part of the AC impedance is increased twice, 5 times, or 10 times, for example, in comparison with the ohmic resistance. The signal generator 14 may apply, to the cell 30, a signal in a high frequency band in which diffusion, reaction, movement, and so on of components of the lithium-ion secondary battery, such as lithium ions, cannot follow. In an example, the signal generator 14 may output a signal in a frequency band not lower than 100 kHz, more preferably at a frequency not lower than 200 kHz, or even more preferably at a frequency not lower than 250 kHz. The signal generator 14 may output a signal in a range not lower than 0.5 MHz and not higher than 5 MHz or a signal in a range not lower than 10 MHz and not higher than 100 MHz. For example, degradation attributable to the deposition of the inert solid metal lithium and the presence of the foreign metal inside the cell 30, and so on can be determined by using the real part of the AC impedance in the range not lower than 0.5 MHz and not higher than 5 MHz. As another example, degradation attributable to the formation of the coating film can be determined by using the real part of the AC impedance in the range not lower than 10 MHz and not higher than 100 MHz. The measuring unit 15 measures at least one of voltage and current responses from the cell 30 corresponding to the signal output from the signal generator 14 to the cell 30. The control module 12 obtains the response(s) from the measuring unit 15 and can derive real part and imaginary part of AC impedance. The communication unit 16 is an interface for communication with an external device. The communication unit 16 performs communication with the external device, the management device 20 connected locally, and so on via an external network 17, such as the Internet, or a LAN.

The management device 20 performs management of the cell 30 based on the information detected by the detection device 11. The management device 20 executes processing to set details of reclamation, exchange, and maintenance of the used cells 30 with a management module 21. The management module 21 is constituted as, for example, a CPU-centric microprocessor and controls the entirety of the device. In an example, by using a result of detecting the status of the deposition of the solid metal lithium inside the cell 30, the result being output from the detection device 11, the management device 20 may determine the cell 30 to be used in a limited field in recycling applications based on a remaining capacity of active lithium. The recycling applications include, for example, reuse in a prescribed usual application like an on-vehicle battery or a mobile battery, reuse depending on the degradation, such as a fixed-point power supply in which high output power is not necessary, and recycling by dismantling. Moreover, by using the result of detecting the status of the deposition of the solid metal lithium inside the cell 30, the result being output from the detection device 11, the management device 20 may execute processing to quantify a remaining value of the lithium-ion secondary battery, including a remaining available time, based on the remaining capacity of the active lithium. Alternatively, by using the result of detecting the status of the deposition of the solid metal lithium inside the cell 30, the result being output from the detection device 11, the management device 20 may calculate a utility value of the cell 30 and output the calculated utility value.

Figure 4:
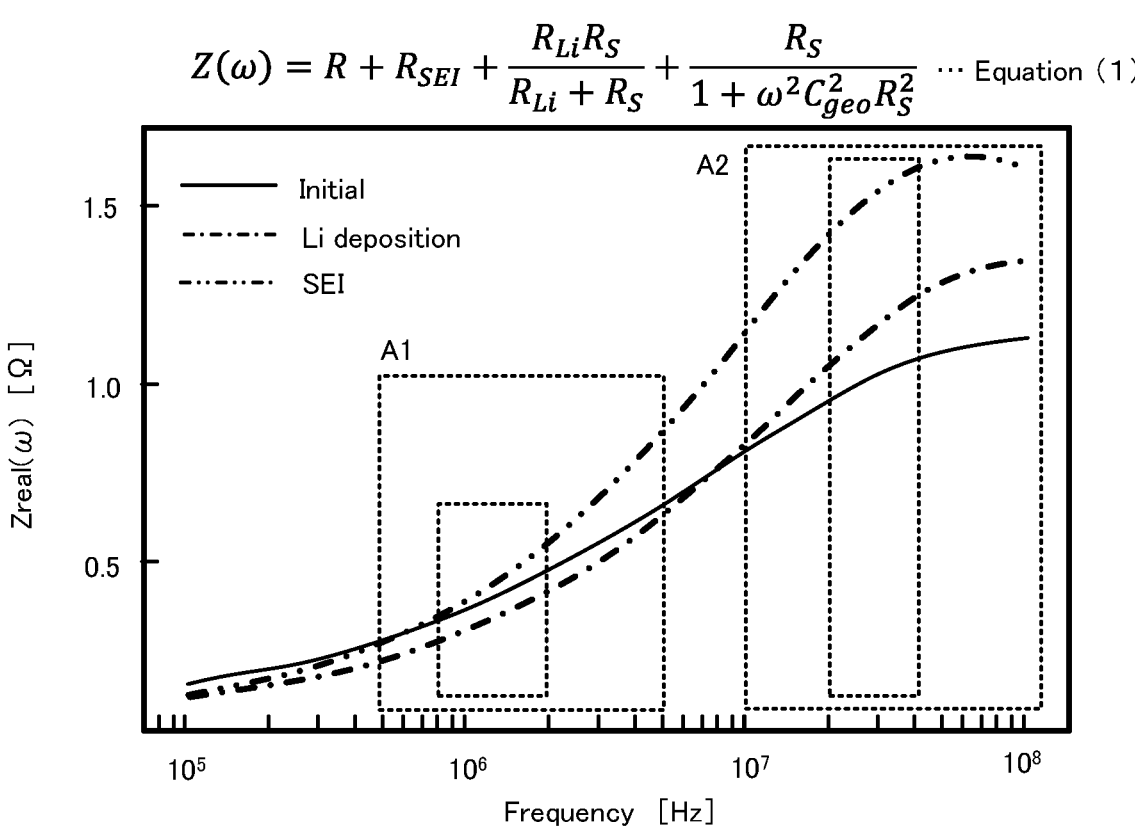
FIG. 4 is a graph representing a relationship between the frequency and the impedance real part in degradation.

The operation principle of the detection device 11 is now described. FIG. 3 is an explanatory view illustrating an example of an equivalent circuit model of the lithium-ion secondary battery. More specifically, FIG. 3A illustrates a mechanical structure model, FIG. 3B illustrates a full model of the equivalent circuit, FIG. 3C illustrates a simplified model of the equivalent circuit, and FIG. 3D illustrates a model of the equivalent circuit in terms of high-frequency function. FIG. 3D represents a model excluding parameters for which impedance can be regarded as substantially zero in terms of high-frequency function. FIG. 4 is a graph representing a relationship between the frequency and the impedance real part in degradation. Table 1 lists notes on various elements. FIG. 4 indicates results of impedance characteristics calculated by using the equivalent circuit model of FIG. 3 and an Equation (1). One of degradation patterns of the lithium-ion secondary battery is the deposition of the lithium metal inside the cell, and there is a concern that more deposition of the metal makes the battery more unsafe. Here, three types of batteries, namely, an initial battery, a battery having degraded with lithium deposition, and a battery having degraded with deposition of SEI (solid electrolyte interphase, also called a coating film), have been studied as representing the status of the lithium-ion secondary battery. As seen from a region A1 in FIG. 4, a decrease in the real part of the AC impedance depending on an amount of the deposited lithium is confirmed in a range not lower than 0.5 MHz and a range not higher than 5 MHz, particularly in a range around 1 MHz. On the other hand, it can be confirmed for the battery having degraded with the SEI deposition that, in the above-mentioned frequency ranges, the real part of the AC impedance is hardly changed in comparison with the initial battery. Thus, whether the battery degradation is caused by the lithium deposition or the formation of the coating film can be clearly distinguished based on the decrease in the real part of the AC impedance, for example, an amount of change in the real part. Moreover, an increase in the impedance depending on an amount of the deposited SEI can be confirmed in a range not lower than 10 MHz and a range not higher than 100 MHz, particularly in a region A2 around 20 MHz. Thus, it is inferred that, in the above-mentioned frequency ranges, an influence of the degradation with the SEI deposition appears more significantly than that of the degradation with the lithium deposition. While FIG. 4 represents the calculation results in accordance with the Equation (1), results having been measured by using a 18650 lithium-ion secondary battery also exhibits a similar tendency to that appearing in a waveform illustrated in FIG. 3. This proves that the calculation results of FIG. 4 are true.

TABLE 1

| symbol | name |
| --- | --- |
| $L_a$ | geometrical inductance of anode side |
| $L_c$ | geometrical inductance of cathode side |
| $L$ | sum of $L_a$ and $L_c$ |
| $C_{geo}$ | geometrical capacitance between anode and cathode |
| $CPE_{dla}$ | electrical double layer capacitance of anode side |
| $CPE_{dlc}$ | electrical double layer capacitance of cathode side |
| $CPE_{dl}$ | sum of $CPE_{dla}$ and $CPE_{dlc}$ |
| $R_a$ | parastic ohmic resistance of anode side |
| $R_c$ | parastic ohmic resistance of cathode side |
| $R$ | sum of $R_a$, $R_c$, and $R_surf$ |
| $R_{CTa}$ | charge transfer resistance of anode side |
| $R_{CTc}$ | charge transfer resistance of cathode side |
| $R_{CT}$ | sum of $R_{CTa}$ nd $R_{CTb}$ |
| $R_{Li}$ | resistance of Lithium dendrite |
| $R_S$ | resitance of electrolyte |
| $R_{SEI}$ | resitance of SEI |
| $R_{surf}$ | resitance of cathode surface film |
| $Z_{Wa}$ | Warburg impedance of anode side |
| $Z_{Wc}$ | Warburg impedance of cathode side |
| $Z_W$ | sum of $Z_{Wa}$ and $Z_{Wc}$ |

As seen from FIG. 3D, a value of the real part of the AC impedance at the high frequency can be expressed by the Equation (1) given below. Here, $R_{Li}$ varying with the lithium metal deposition is denoted by $R_{Li}(\omega)$ to explicitly indicate frequency dependence, and $R_{SEI}$ varying with the SEI deposition is denoted by $R_{SEI}(\omega)$ to explicitly indicate frequency dependence ($\omega$ denotes an angular frequency). When parameters other than $R_{Li}(2\pi f)$, $R_{SEI}(\omega)$, and $R_S$, $R_S$ being a resistance parallel to $R_{Li}(\omega)$, are denoted by $R_{etc}$ because those parameters hardly cause impedance variations with the degradation, the Equation (1) can be rewritten into the following Equation (2) using $R_{Li}(\omega)$, $R_{SEI}(\omega)$, $R_S$, and $R_{etc}$. Assuming here the amount of the deposited metal lithium to be denoted by $Q_{Li}$ and the amount of the deposited SEI to be denoted by $Q_{SEI}$, a relational expression between each of the amounts of both the depositions and impedance is given by the following Equation (3). Here, $\sigma_{Li}$ denotes a coefficient for converting Li impedance to the amount of the deposition, $\alpha_{SEI}$ denotes a coefficient for converting SEI impedance to the amount of the deposition, $R^{init}_{SEI}(\omega)$ denotes impedance corresponding to the initial SEI, and $R^{degr}_{SEI}(\omega)$ denotes impedance corresponding to the SEI after the degradation. The reason why the equation regarding the SEI includes subtraction resides in that the SEI is already formed in the initial battery and is observed as impedance. Since the metal lithium is not deposited in the initial battery and $Q_{Li}=0$ is held, $R^{init}_{SEI}(\omega)=\infty$ is held ($R^{init}_{Li}(\omega)$ denotes initial lithium impedance). Furthermore, $R_{SEI}(\omega)=0$ is assumed because the SEI hardly causes a dielectric saturation loss when the frequency is about 1 MHz. In this case, initial impedance $Z^{init}(\omega)$ and impedance $Z^{degr}(\omega)$ after the degradation around 1 MHz can be expressed by the following Equations (4) and (5), respectively. Here, $Q_{Li}$ can be obtained from an impedance change between before and after the degradation by using the following Equation (6). Since $Z^{init}(\omega)$ and $Z^{degr}(\omega)$ are values obtainable with the measurement and $\alpha_{Li}$ and $R_S$ take values specific to the materials and the shape of the battery, the amount of the deposited lithium can be estimated. Moreover, impedances in the initial state and after the degradation around 20 MHz can be expressed, respectively, by the following Equations (7) and (8). As in the above-described case, $Q_{SEI}$ can be obtained from an impedance change between before and after the degradation by using the following Equation (9). In the Equation (9), k denotes a constant depending on a frequency ratio based on the skin effect of the lithium metal. On condition of 1 MHz ($=\omega_1$), k$=\sqrt{(\omega_2/\omega_1)}$ is given because the ratio indicates comparison with 20 MHz ($=\omega_2$). Assuming a capacity degradation degree of the battery to be $\Delta Cap$, the following Equation (10) is held because inactivated lithium is generated in the form of metal lithium and SEI. In the Equation (10), $Q_{Li}+Q_{SEI}$ is obtained by acquiring the impedance at 1 MHz and the impedance at 20 MHz, and therefore the capacity degradation degree can be calculated. Likewise, the amount of the deposited metal lithium can be estimated if $\Delta Cap$ and the impedance at 20 MHz are obtained. Accordingly, a proportion of the metal deposition in a degraded status can be estimated by using the results of impedance measurements in, for example, the above-mentioned two frequency bands.

Math. 1

$$Z(\omega) = R + R_{SEI} + \frac{R_{Li}R_S}{R_{Li} + R_S} + \frac{R_S}{1 + \omega^2 C_{geo}^2 R_S^2} \qquad \text{Equation (1)}$$

$$Z(\omega) = R_{SEI}(2\pi f) + \frac{R_{Li}(\omega)R_S}{R_{Li}(\omega) + R_S} + R_{etc} \qquad \text{Equation (2)}$$

$$Q_{Li} = \frac{\alpha_{Li}}{R_{Li}(\omega)} \qquad \text{Equation (3)}$$

$$Z^{init}(\omega) = R_S + R_{etc} \qquad \text{Equation (4)}$$

$$Z^{degr}(\omega) = \frac{R_S R_{Li}^{degr}(\omega)}{R_S + R_{Li}^{degr}(\omega)} + R_{etc} \qquad \text{Equation (5)}$$

$$Q_{Li} = \frac{\alpha_{Li}\left(Z^{init}(\omega) - Z^{degr}(\omega)\right)}{\left(R_S^2 + R_S\left(Z^{degr}(\omega) - Z^{init}(\omega)\right)\right)} \qquad \text{Equation (6)}$$

$$Z^{init}(\omega) = R_{SEI}^{init}(\omega) + R_S + R_{etc} \qquad \text{Equation (7)}$$

$$Z^{degr}(\omega) = R_{SEI}^{degr}(\omega) + \frac{R_S R_{Li}^{degr}(\omega)}{R_S + R_{Li}^{degr}(\omega)} + R_{etc} \qquad \text{Equation (8)}$$

$$Q_{SEI} = \alpha_{SEI}\left(Z^{degr}(\omega) - Z^{init}(\omega)\right) + \left(\frac{R_S^2}{R_S + k\frac{\alpha_{Li}}{Q_{Li}}}\right)^2 \qquad \text{Equation (9)}$$

$$\Delta Cap = Q_{Li} + Q_{SEI} \qquad \text{Equation (10)}$$

(Detection Method)

An operation of the above-described detection device 11 according to this embodiment, especially, a method of detecting the status of the lithium-ion secondary battery, the method being executed by the detection device 11, will be described below. The detection method may include a detection step of detecting deposition of lithium and/or the presence of foreign metal inside the lithium-ion secondary battery by using the real part of the AC impedance at the frequency at which the real part of the AC impedance is increased 10 times or more than that at 1 kHz due to the skin effect. Furthermore, the detection method may include, prior to the detection step, an acquisition step of acquiring the real part of the AC impedance by applying, to the lithium-ion secondary battery, the frequency at which the real part of the AC impedance is increased 10 times or more than that at 1 kHz due to the skin effect. For convenience of explanation, the detection step is described here mainly about the case of detecting the deposition of the inert solid metal lithium and detecting degradation of the battery.

Figures 5, 5A, 5B:
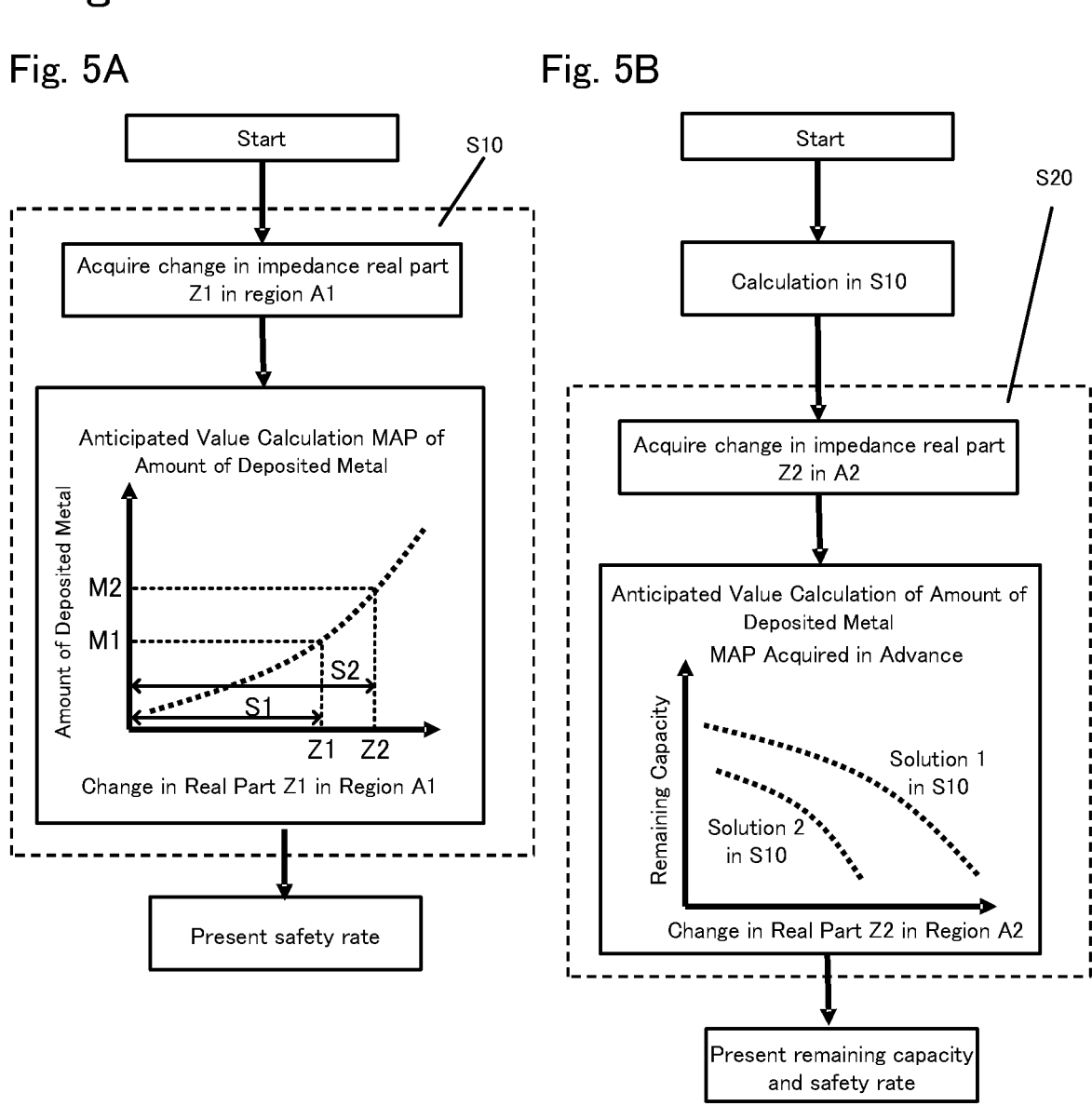
FIG. 5 is a flowchart illustrating an outline of arithmetic processing to detect a cell status.

FIG. 5 is a flowchart illustrating an outline of arithmetic processing to detect a cell status, the arithmetic processing being incorporated in the control module 12. More specifically, FIG. 5A represents the arithmetic processing for the frequency region A1, and FIG. 5B represents the arithmetic processing for the frequency region A2. The control module 12 calculates the degradation degree of the cell 30 and the amount of the deposited metal lithium from the real part of the AC impedance in the high frequency band. Furthermore, because a resistance change caused by mixing of the foreign metal into the battery can be detected based on the above-described principle with respect to the deposition of the metal lithium, it is possible to perform inspection before shipment by using the detected information and to improve quality in a production process. As illustrated in FIG. 5A, the control module 12 executes processing to measure the real part of the AC impedance of the cell 30 in the frequency region A1, to derive an amount of change in the real part from an initial value, and to obtain the amount of the deposited metal lithium from the amount of change in the real part of the AC impedance by using a MAP acquired in advance (S10). The MAP can be set based on, for example, a relationship between the amount of change in the real part of the AC impedance and the amount of the deposited metal lithium, the relationship being empirically obtained in advance by experiences, for example. In addition, the control module 12 presents, for example, a safety rate of the target cell 30 based on the obtained amount of the deposited metal lithium. After the calculation in S10, as illustrated in FIG. 5B, the control module 12 executes processing to measure the real part of the AC impedance of the cell 30 in the frequency region A2 and to obtain a remaining capacity SOC from the real part of the AC impedance by using a MAP acquired in advance (S20). The MAP can be set based on, for example, a relationship between an amount of change in the real part of the AC impedance and the remaining capacity SOC, the relationship being empirically obtained in advance by experiences, for example. Moreover, the control module 12 presents, for example, the safety rate and the remaining capacity SOC of the target cell 30, and so on.

Figure 6:
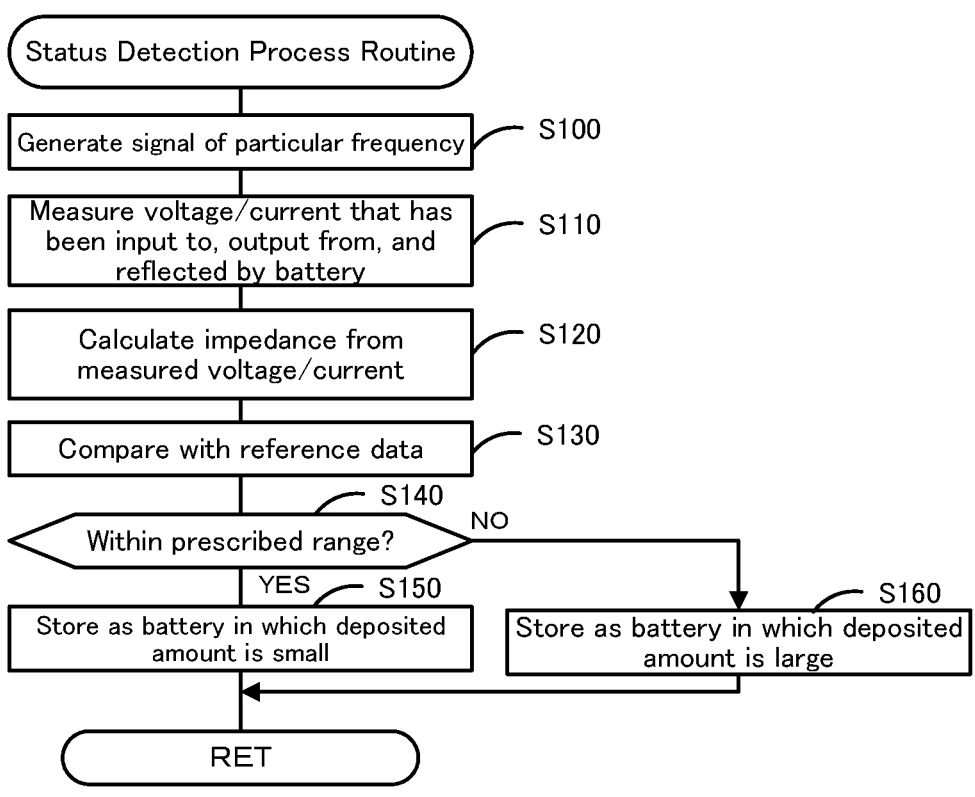
FIG. 6 is a flowchart illustrating an example of a status detection process routine.

More detailed processing in the detection device 11 will be described below. FIG. 6 is a flowchart illustrating an example of a status detection process routine executed by the control module 12 in the detection device 11. The routine is executed at timing of detecting the status of degradation of the cell 30. That timing may be set to, for example, timing when a routine start command is input by a worker, or timing after the lapse of a predetermined period (for example, one week or one month) during which the deterioration progresses up to a recognizable level. The control module 12 executes the routine with the aid of the signal generator 14 and the measuring unit 15. Upon start of the routine, the control module 12 instructs the signal generator 14 to generate a signal of a particular frequency (S100) and instructs the measuring unit 15 to measure a voltage and/or a current that has been input to, output from, and reflected by the cell 30 (S110). The particular frequency may be set to the above-described frequency at which the real part of the AC impedance is increased 10 times or more than that at 1 kHz due to the skin effect, or the above-described high frequency, namely the frequency of 100 kHz or higher, at which diffusion, reaction, movement, and so on of the components of the lithium-ion secondary battery, such as the lithium ions, cannot follow.

Then, the control module 12 calculates the AC impedance from the measured voltage and/or current (S120) and compares a calculation result with reference data (S130). The control module acquires the real part of the AC impedance and further acquires, as an amount of change, a difference value between the acquired real part and the real part of the AC impedance of the cell 30 in an initial state. The reference data may be set to, for example, a prescribed range (e.g., a range S1 in FIG. 5A) that is prescribed as a range of the amount of the deposited solid metal lithium where charge and discharge can be safely performed in the cell 30 in the degraded status. Then, the control module 12 determines whether the obtained amount of change in the real part of the AC impedance is within the prescribed range (S140). If the obtained amount of change is within the prescribed range, the control module 12 stores, in the storage unit 13, the target cell 30 as a battery in which the amount of the deposited solid metal lithium is small (S150), and then ends the routine. On the other hand, if the amount of change in the real part of the AC impedance, obtained in S140, is outside the prescribed range, the control module 12 stores, in the storage unit 13, the target cell 30 as a battery in which the amount of the deposited solid metal lithium is large (S160), and then ends the routine. Here, the control module 12 may output a determination result in S140 to a display unit (not illustrated) to be displayed on it.

Figure 7:
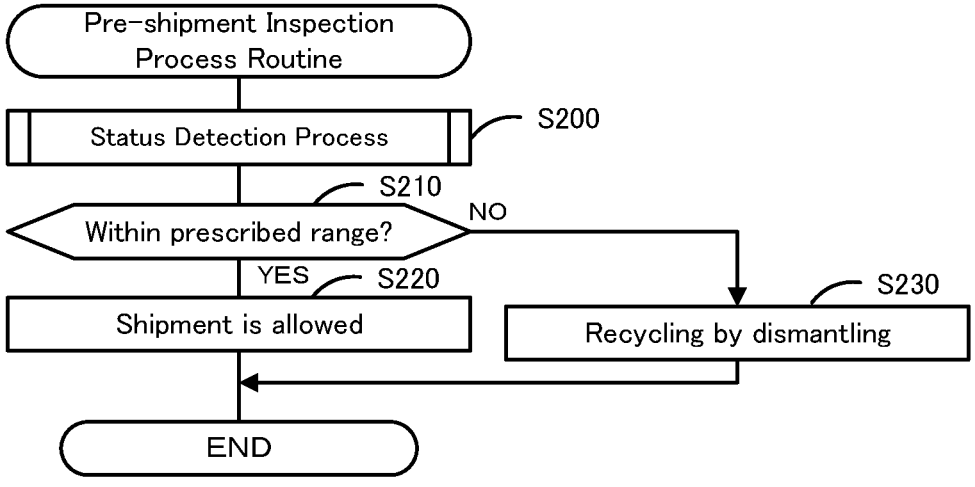
FIG. 7 is a flowchart illustrating an example of a pre-shipment inspection process routine.

An evaluation process for the cell 30, executed by using the detection result of the status detection process routine for the cell 30, will be described below. FIG. 7 is a flowchart illustrating an example of a pre-shipment inspection process routine executed by the control module 12 in the detection device 11. This routine is stored in the storage unit 13 and is executed when pre-shipment inspection is performed after manufacturing of the cell 30. As an alternative, this routine may be executed by the management module 21 in the management device 20. Upon start of the routine, the control module 12 executes the above-described status detection process (S200) and determines whether the obtained amount of change in the real part of the AC impedance is within the prescribed range (S210). If the obtained amount of change in the real part of the AC impedance is within the prescribed range, the control module 12 regards this result as indicating that no foreign metals are present inside the cell 30. Thus, the control module 12 outputs information indicating that shipment of the cell 30 is allowed (S220), and then ends the routine. On the other hand, if the obtained amount of change in the real part of the AC impedance is outside the prescribed range, the control module 12 regards this result as indicating that any foreign metal is present inside the cell 30. Thus, the control module 12 outputs information indicating that the target cell 30 should be transferred to recycling by dismantling (S230), and then ends the routine. The control module 12 may output the above information to be stored in the storage unit 13 or to be displayed on the display unit. Because the solid metal lithium generated due to charge and discharge is not present inside the cell 30 immediately after manufacturing, the presence of the foreign metal inside the cell 30 can be determined when the amount of change in the real part of the AC impedance is outside the prescribed range. That cell 30 cannot be shipped, and hence it is transferred to, for example, recycling by dismantling for further utilization of resources.

Figure 8:
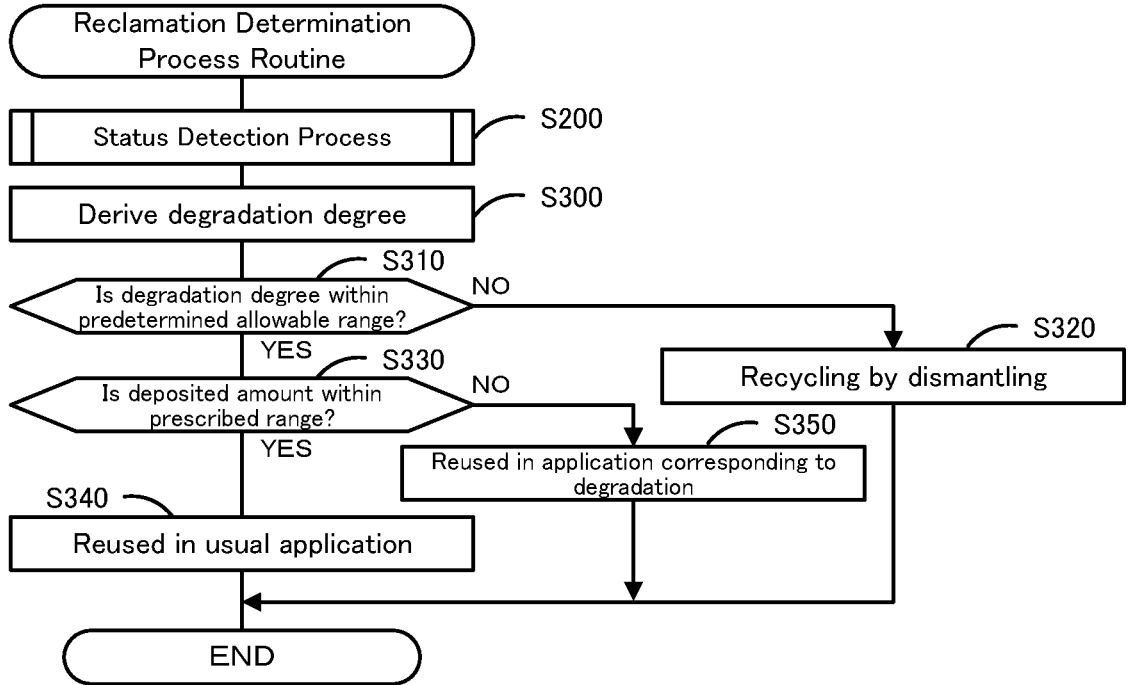
FIG. 8 is a flowchart illustrating an example of a reclamation determination process routine.

A selection process for the reuse application of the cell 30, executed by using the detection result of the status detection process routine for the cell 30, will be described below. FIG. 8 is a flowchart illustrating an example of a reclamation determination process routine executed by the control module 12 in the detection device 11. This routine is stored in the storage unit 13 and is executed after the cell 30 has been used and collected for reclamation. As an alternative, this routine may be executed by the management module 21 in the management device 20. Upon start of the routine, the control module 12 executes the above-described status detection process (S200) and derives a degradation degree from the acquired real part of the AC impedance (S300). The degradation degree can be derived from, for example, a relationship between the remaining capacity SOC obtained in the above-described S20 and the degradation degree, the relationship being empirically acquired in advance.

Then, the control module 12 determines whether the degradation degree is within a predetermined allowable range (S310). The predetermined allowable range may be set to, for example, a range (e.g., a range S2 in FIG. 5A) that is empirically prescribed as a limit range of the amount of the deposited solid metal lithium, the limit range representing that charge and discharge cannot be safely performed in the cell 30 in the degraded status if the degradation degree exceeds the allowable range. If the degradation degree is outside the allowable range, the control module 12 outputs the information indicating that the target cell 30 should be transferred to recycling by dismantling (S320). The control module 12 may output the above information to be stored in the storage unit 13 or to be displayed on the display unit. On the other hand, if the degradation degree is within the allowable range in S310, the control module 12 determines whether the amount of the deposited solid metal lithium is within a prescribed range (S330). The amount of the deposited solid metal lithium can be obtained through the above-described process in S10. The prescribed range may be prescribed as a range (e.g., the range S1 in FIG. 5A) of the amount of the deposited solid metal lithium where charge and discharge can be safely performed in the cell 30 in the degraded status. If the amount of the deposited solid metal lithium is within the prescribed range, the control module 12 outputs information indicating that the cell 30 should be reused in a usual application (S340), and then ends the routine. On the other hand, if the amount of the deposited solid metal lithium is outside the prescribed range, the control module 12 outputs information indicating that the cell 30 should be reused in an application corresponding to the degradation of the cell 30 (S350), and then ends the routine. The application corresponding to the degradation is, for example, the case that an on-vehicle battery for which a high output power in a short time is required is reused as a fixed power supply for housing, for example, in which high-rate performance is less likely to be demanded. As described above, using the detection device 11 makes it possible to grasp the degradation degree of the cell 30 and to grasp a more detailed status of the degradation such as whether the degradation is caused by the formation of the coating film on the electrode or by the deposition of the inert solid metal lithium on the electrode.

Correspondence between constituent elements in this embodiment and constituent elements in the present disclosure is clarified here. The cell 30 in this embodiment corresponds to a "lithium-ion secondary battery" in the present disclosure. The detection device 11 corresponds to a "detection device", the management device 20 corresponds to a "management device", and the control module 12 corresponds to a "control module". Note that the description of the operation of the detection device 11 in this embodiment is further intended to clarify an example of the detection method according to the present disclosure.

The embodiment described above can provide the novel detection device 11, management device 20, and detection method each capable of detecting the status of the lithium-ion secondary battery in detail. The reason why the present disclosure has the above-mentioned advantageous effect is inferred as follows. For example, a decrease in resistance attributable to the lithium deposition can be captured at a high frequency at which diffusion, reaction, movement, and so on of the components of the lithium-ion secondary battery, such as the lithium ions, cannot follow, the high frequency being within a high frequency band (for example, the frequency band not lower than 100 kHz) in which measurement can be performed. It is also inferred that, in such a high frequency band, the measurement is not affected by degradation caused by diffusion, reaction, movement, and so on of other components than the lithium ions and has sensitivity for only the metal deposition.

Furthermore, the detection device 11 detects the deposition of lithium and/or the presence of foreign metal inside the lithium-ion secondary battery by using the real part of the AC impedance in the frequency band not lower than 100 kHz. Particularly, the deposition of the inert solid metal lithium and/or the presence of the foreign metal inside the lithium-ion secondary battery is detected based on a decrease in the real part of the AC impedance, the decrease being obtained in the frequency range not lower than 0.5 MHz and not higher than 5 MHz. Furthermore, the detection device 11 estimates the amount of the coating film deposited on the electrode based on an increase in the real part of the AC impedance, the increase being obtained in the frequency range not lower than 10 MHz, and detects the degradation caused by the formation of the coating film. Thus, the detection device 11 can more clearly distinguish the status of the degradation attributable to the deposition of the slid metal lithium and the status of the degradation attributable to the formation of the coating film by using a plurality of different frequency bands. By utilizing the information obtained as described above, the detection device 11 can more appropriately select the reuse application of the cell 30.

It is needless to say that the present disclosure is not limited to the above-described embodiment and can be implemented in various forms insofar as falling within the technical scope of the present disclosure.

While the above embodiment is described in connection with the battery management system 10 including one cell 30, the present disclosure is not limited to that case, and the detection device 11 may be applied to the battery management system 10 in which the cells 30 are connected in series, or the battery management system 10 in which the cells 30 are connected in parallel.

Figure 9:
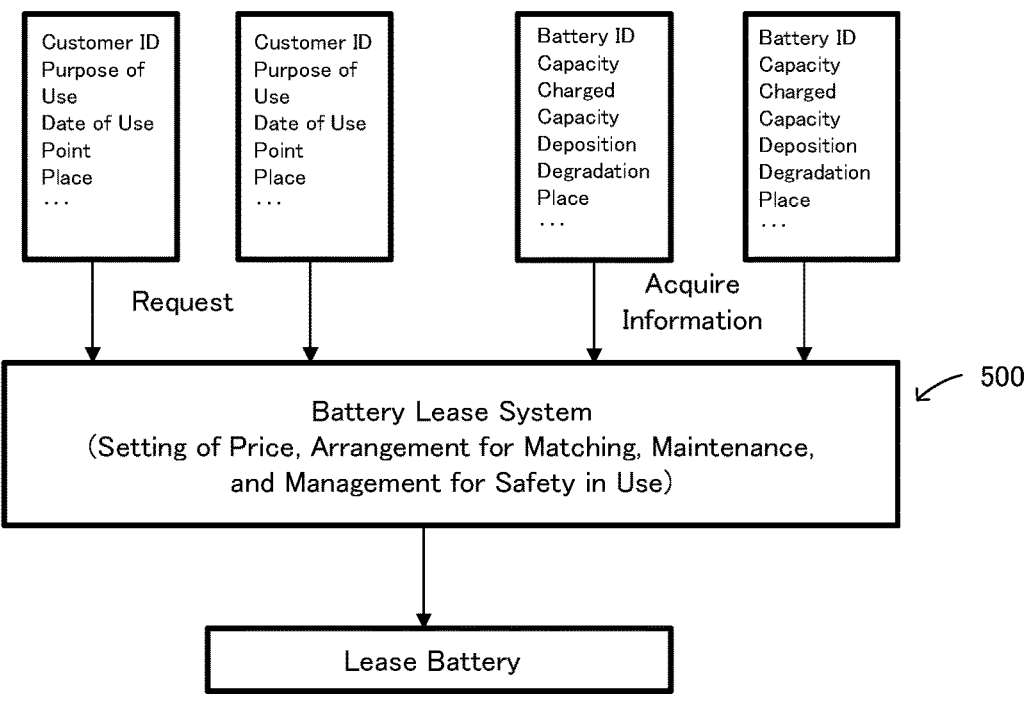
FIG. 9 is an explanatory view illustrating an example of a data storage for lease of cells.
Figure 10:
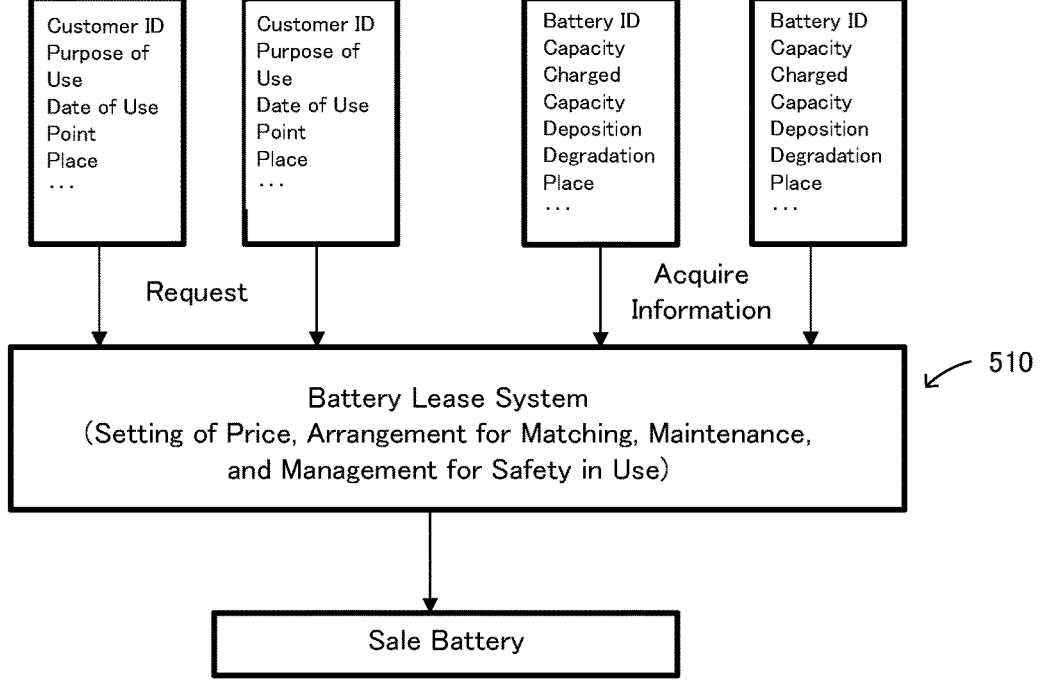
FIG. 10 is an explanatory view illustrating an example of a data storage for sale of cells.

FIG. 9 is an explanatory view illustrating an example of a data storage for lease of cells. FIGS. 9 and 10 represent an example of service that can be provided by an administrator. Assuming, for example, the battery management system 10 to be implemented in cooperation with a management algorithm for managing battery lease, lease service capable of managing safety in use can be provided. As illustrated in FIG. 9, a battery lease system 500 acquires, from a customer, information such as the customer ID, the purpose of use, the date of use, service points, and the place of use. The battery lease system 500 further acquires information such as the battery ID, the remaining capacity SOC, the charged capacity, the status of lithium deposition, the status of degradation, and the place of use of a battery module after having been used. Then, the battery lease system 500 can lease an appropriate battery module to the customer after executing setting of a price of the battery module to be leased, arrangement for matching with the customer, maintenance, and management for safety in use.

FIG. 10 is an explanatory view illustrating an example of a data storage for sale of cells. Assuming, for example, the battery management system 10 to be implemented in cooperation with an algorithm for managing a degradation safety rate, resale service for reusable batteries can be built. As illustrated in FIG. 10, a battery reuse system 510 acquires, from a customer, information such as the customer ID, the purpose of use, the date of use, service points, and the place of use. The battery reuse system 510 further acquires information such as the battery ID, the remaining capacity SOC, the charged capacity, the status of lithium deposition, the status of degradation, and the place of use of a battery module after having been used. Then, the battery reuse system 510 can sale an appropriate reusable battery module to the customer after executing setting of a price of the battery module to be reused, arrangement for matching with the customer, maintenance, and management for safety in use.

While the above embodiment is described in connection with the case of executing the pre-shipment inspection process routine by the detection device 11, namely the case in which the detection device 11 has the function of the management device in the present disclosure, there is no especial reason for limiting the present disclosure to that case, and the management device 20 may execute the pre-shipment inspection process routine. Even in such a case, the result of detecting whether the foreign metal is present can be properly utilized.

While the above embodiment is described in connection with the case of executing the reclamation determination process routine by the detection device 11, namely the case in which the detection device 11 has the function of the management device in the present disclosure, there is no especial reason for limiting the present disclosure to that case, and the management device 20 may execute the reclamation determination process routine. Even in such a case, the information regarding the deposition of the solid metal lithium can be properly used for determining reuse or recycling of the cell 30.

EXAMPLE

An example in which the detection device and the detection method according to the present disclosure have been reviewed in detail will be described below as an experimental example.

Experimental Example 1

Cylindrical 18650 lithium-ion secondary batteries being commercially available and using $LiNi_{1/3}Co_{1/3}Mn_{1/3}O_2$ as the positive electrode active material and graphite as the negative electrode active material were degraded by using two types of degradation methods to prepare batteries that were brought into two different statuses of degradation. As a first type of battery, a plurality of batteries was prepared by repeating a charge-discharge cycle at 60° C. and 0.5 C such that the degradation degree relative to the initial capacity was reduced to about a level of 92% to 84%, the above cycle indicating a degradation condition under which the deposition of the inert solid metal lithium is very small. As a second type of battery, a plurality of batteries was prepared by repeating a charge-discharge cycle at 20° C. and 2 C such that the degradation degree relative to the initial capacity was reduced to a level of about 92% to 87%, the above cycle indicating a degradation condition under which the inert solid metal lithium is apt to deposit. For each of the prepared batteries, the AC impedance was measured under the conditions of the predetermined frequency range and the remaining capacity SOC. First, the initial impedance of the battery was measured in a range of 100 kHz to 100 MHz by using a network analyzer (E5061B available from Keysight Co.). Then, the impedance of each of the above-described degraded batteries was also measured in a similar manner. Measurement conditions were set to the remaining capacity SOC of 40% and the measurement temperature of 20° C. The difference between the measured initial real part and the measured real part after the degradation was calculated and obtained as an amount of change $\Delta Z_{re}(m\Omega)$ in the real part of the AC impedance.

(Calculation of Capacity Degradation Degree)

An estimation capacity rate of each of the above-described degraded batteries were calculated from the measurement values of the AC impedance by using the above-mentioned Equations (9) and (10). Table 2 lists parameters used.

TABLE 2

| symbol | value |
|---|---|
| $\alpha_{Li}$ | 2 |
| $\alpha_{SEI}$ | 20 |
| $R_S(@1\ MHz)$ | 0.39 |
| $R_S(@20\ MHz)$ | 0.3 |

(Results and Reviews)

Figure 11:
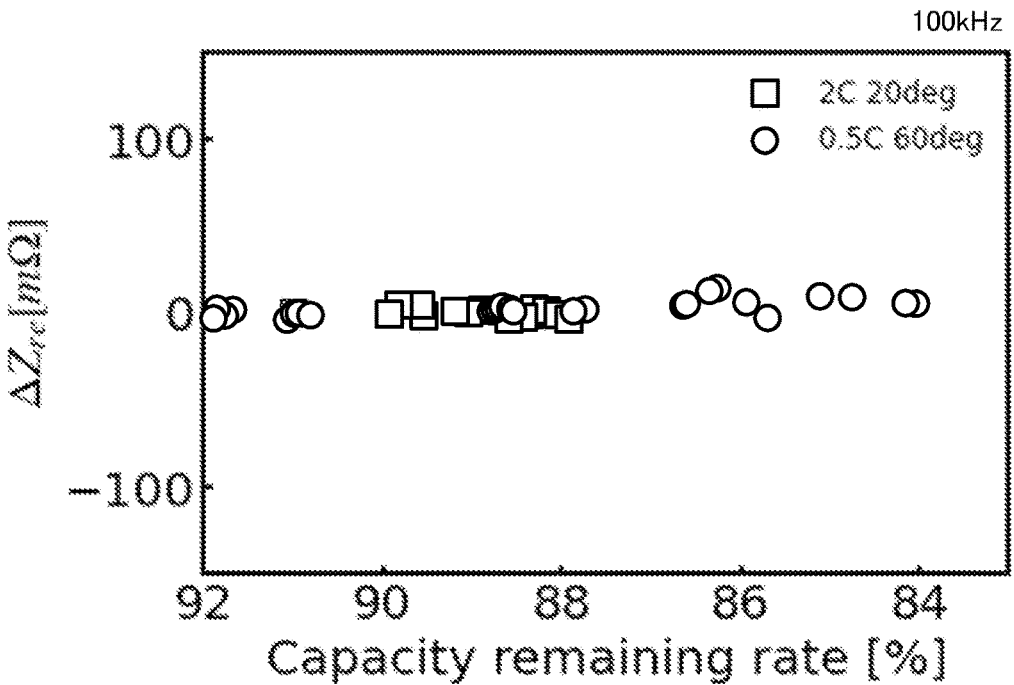
FIG. 11 is a graph representing a relationship between a capacity remaining rate and an amount of change in the impedance real part at 100 kHz.
Figure 12:
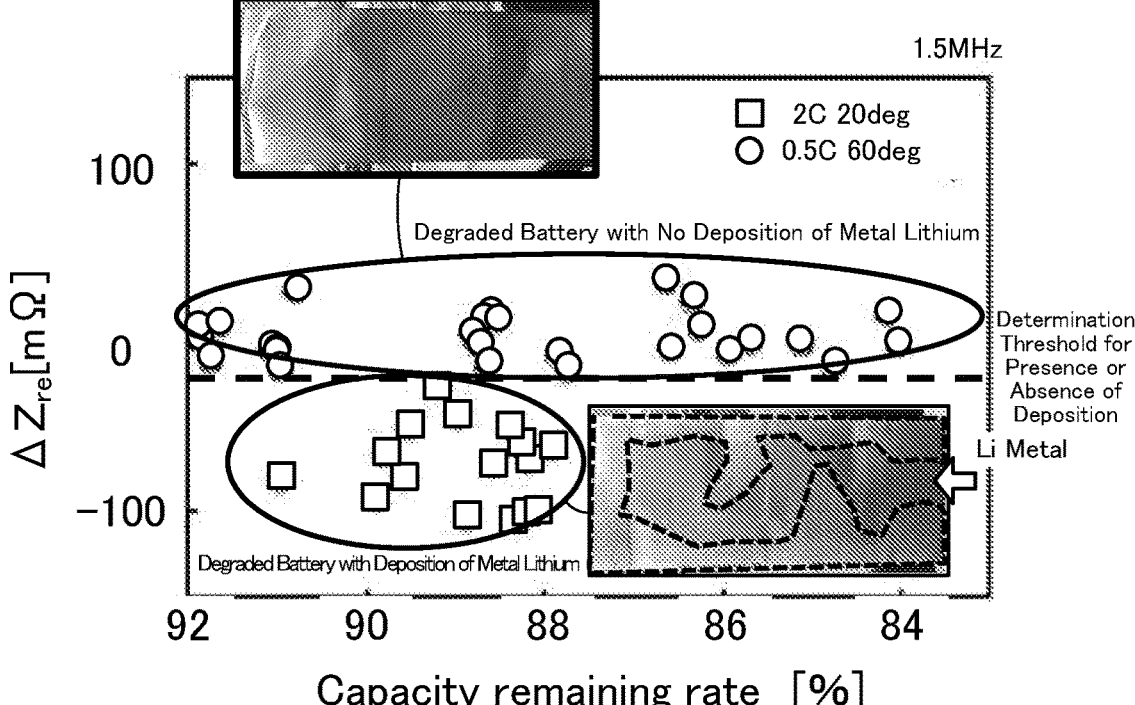
FIG. 12 is a graph representing a relationship between the capacity remaining rate and the amount of change in the impedance real part at 1.5 MHz.
Figure 13:
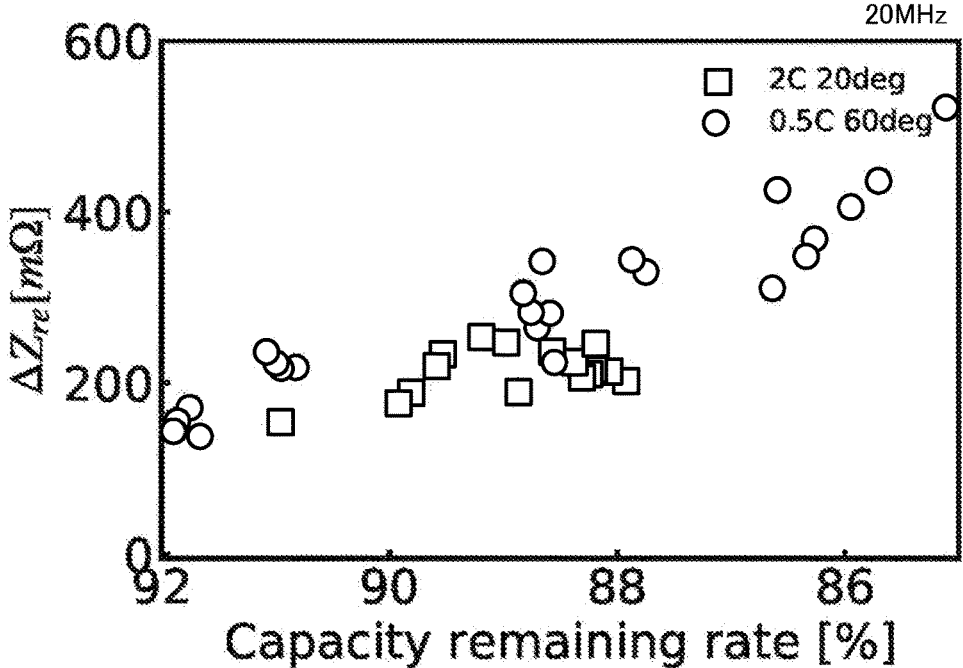
FIG. 13 is a graph representing a relationship between the capacity remaining rate and the amount of change in the impedance real part at 20 MHz.

FIG. 11 is a graph representing a relationship between a capacity remaining rate and an amount of change in the impedance real part at 100 kHz according to EXPERIMENTAL EXAMPLE 1. FIG. 12 is a graph representing a relationship between the capacity remaining rate and the amount of change in the impedance real part at 1.5 MHz according to EXPERIMENTAL EXAMPLE 1. Photos of electrodes after dismantling in the battery with a large amount of the deposited metal lithium and the battery with no deposition are attached to FIG. 12. FIG. 13 is a graph representing a relationship between the capacity remaining rate and the amount of change in the impedance real part at 20 MHz according to EXPERIMENTAL EXAMPLE 1. In FIGS. 11 to 14, the degraded battery with no deposition of the metal lithium is denoted by "○", and the degraded battery with the deposition of the metal lithium is denoted by "□". As seen from FIG. 11, the amount of change in the real part of the AC impedance at the frequency of 100 kHz exhibits no difference in resistance depending on whether the metal lithium is deposited, and a change in resistance cannot be observed. By contrast, as seen from FIG. 12, at the frequency of 1.5 MHz, the value of the real part of the AC impedance is reduced only in the degraded battery with the deposition of the metal lithium. To confirm the presence or the absence of the deposition, respective typical ones of the two types of the degraded batteries were dismantled, and the amounts of the deposited lithium were examined. As a result, it was confirmed that the metal lithium was not deposited in the degraded battery examined under the condition causing no deposition of the metal lithium, and that the metal lithium was deposited in the degraded battery examined under the condition causing the deposition of the metal lithium. Thus, as seen from FIGS. 11 and 4, the status of the degradation caused by the deposition of the metal lithium can be detected separately from the status of the degradation caused by the formation of the SEI based on the amount of change in the real part of the AC impedance in the frequency band, for example, not lower than 0.5 MHz and not higher than 5 MHz. Furthermore, as seen from FIG. 13, the change in resistance relative to the initial value of the real part of the AC impedance at 20 MHz indicates that the amount of change in the real part of the AC impedance varies depending on the amount of the coating film (SEI) formed on the electrode. In other words, as seen from FIGS. 13 and 4, the degradation caused by the formation of the SEI can be evaluated based on the amount of change in the real part of the AC impedance relative to the initial value in the frequency band in the range, for example, not lower than 10 MHz and not higher than 100 MHz.

Figure 14:
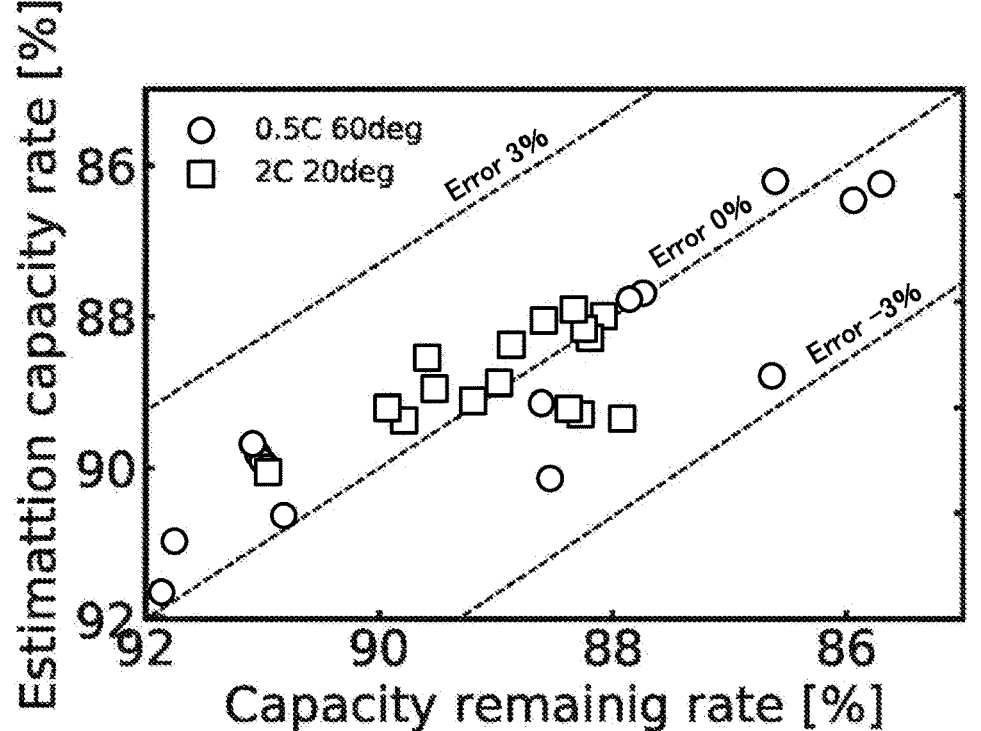
FIG. 14 is a graph representing a relationship between the capacity remaining rate and an estimation capacity rate.

FIG. 14 is a graph representing a relationship between the capacity remaining rate (%) obtained from actual measurement of the degraded battery and the estimation capacity rate (%) obtained from the AC impedance. The estimation capacity rate is a value of the degradation degree calculated using the values of the real part of the impedance at 1 MHz and 20 MHz. As seen from FIG. 14, an error between the capacity remaining rate (%) measured actually and the estimation capacity rate (%) given as the calculation result is within ±3%, and the degradation degree can also be obtained with high reliability by calculation.

While EXAMPLE of the present disclosure has been described in detail above, the present disclosure is in no way limited to the above-described EXAMPLE and can be variously modified within the scope not departing from the gist of the present disclosure.

The present application claims priority from Japanese Patent Application No. 2021-003692, filed on Jan. 13, 2021, the entire contents of which are incorporated herein by reference.

INDUSTRIAL APPLICABILITY

The detection device, the management device, and the detection method disclosed in this description can be utilized in the technical field of detecting the status of the lithium-ion secondary battery.

REFERENCE SIGNS LIST

10 battery management system, 11 detection device, 12 control module, 13 storage unit, 14 signal generator, 15 measuring unit, 16 communication unit, 17 external network, 20 management device, 21 management module, 30 cell, 500 battery lease system, and 510 battery reuse system.

The invention claimed is:

1. A detection device for detecting a status of a lithium-ion secondary battery, the detection device comprising:
a control module that acquires real part of AC impedance at a frequency at which the real part of the AC impedance is increased 10 times or more than the real part of the AC impedance at 1 kHz due to a skin effect, and that detects deposition of lithium and/or presence of foreign metal inside the lithium-ion secondary battery by using the acquired real part of the AC impedance.

2. The detection device according to claim 1, wherein the control module detects the deposition of the lithium and/or the presence of the foreign metal inside the lithium-ion secondary battery by using the real part of the AC impedance in a frequency band not lower than 100 kHz.

3. The detection device according to claim 1, wherein the control module detects the deposition of the lithium and/or the presence of the foreign metal inside the lithium-ion secondary battery based on a decrease in the real part of the AC impedance, the decrease being obtained at a frequency in a range not lower than 0.5 MHz.

4. The detection device according to claim 1, wherein the control module estimates, on the deposited lithium, an amount of the lithium deposited as inert solid metal lithium.

5. The detection device according to claim 1, wherein the control module detects degradation caused by formation of a coating film on an electrode based on an increase in the real part of the AC impedance, the increase being obtained at a frequency in a range not lower than 10 MHz.

6. The detection device according to claim 5, wherein the control module estimates an amount of the coating film deposited.

7. A management device for managing the lithium-ion secondary battery based on information obtained from the detection device according to claim 1, the management device comprising:
a management module that sets a recycle application of the lithium-ion secondary battery by using a detection result of lithium deposition inside the lithium-ion secondary battery, the detection result being output from the control module.

8. A management device for managing the lithium-ion secondary battery based on information obtained from the detection device according to claim 1, the management device comprising:
a management module that sets whether to ship the lithium-ion secondary battery by using a detection result of the presence of the foreign metal inside the lithium-ion secondary battery, the detection result being output from the control module.

9. A detection method of detecting a status of a lithium-ion secondary battery, the detection method comprising the step of:
detecting deposition of lithium and/or presence of foreign metal inside the lithium-ion secondary battery by using real part of AC impedance at a frequency at which the real part of the AC impedance is increased 10 times or more than the real part of the AC impedance at 1 kHz due to a skin effect.

* * * * *